United States Patent [19]

Minsky et al.

[11] 3,927,610

[45] Dec. 23, 1975

[54] AUXILIARY COOKING UTENSIL LEG

[75] Inventors: Norman C. Minsky; Russell D. Hiatt, both of West Bend, Wis.

[73] Assignee: Dart Industries Inc., Los Angeles, Calif.

[22] Filed: Apr. 24, 1975

[21] Appl. No.: 571,127

[52] U.S. Cl. ............ 99/425; 99/444; 220/69; 248/188.6
[51] Int. Cl.² ............ A47J 36/34; A47J 37/10
[58] Field of Search ........ 220/69; 99/425, 444, 448, 99/451; 16/114 A; 219/436–442; 248/188.2, 188.6, 130, 133, 145.6, 149, 151, 153, 439, 455, 456, 457

[56] References Cited
UNITED STATES PATENTS

| | | | |
|---|---|---|---|
| 1,090,924 | 3/1914 | Lawrence | 99/425 X |
| 2,778,931 | 1/1957 | Cruz | 248/168 X |
| 3,081,395 | 3/1963 | Wickenberg | 219/441 |
| 3,086,448 | 4/1963 | Forman | 99/425 |
| 3,146,339 | 8/1964 | Jepson et al. | 219/442 |
| 3,196,253 | 7/1965 | Jepson et al. | 219/436 |
| 3,215,063 | 11/1965 | Olson et al. | 16/114 A X |
| 3,635,371 | 1/1972 | Oxel | 220/69 |
| 3,635,432 | 1/1972 | Hollander | 248/188.6 |

FOREIGN PATENTS OR APPLICATIONS

| | | | |
|---|---|---|---|
| 19,083 | 10/1892 | United Kingdom | 99/425 |
| 512,420 | 9/1939 | United Kingdom | 99/425 |
| 159,342 | 6/1957 | Sweden | 248/188.6 |
| 244,056 | 3/1963 | Australia | 219/438 |
| 258,514 | 3/1965 | Australia | 219/436 |

*Primary Examiner*—William Price
*Assistant Examiner*—Stephen Marcus
*Attorney, Agent, or Firm*—Kenneth J. Hovet; Leigh B. Taylor; Paul R. Wylie

[57] ABSTRACT

An auxiliary leg for a household cooking utensil pivotally mounted on an electrical terminal housing. A bracket is secured to the outer walls of the housing and matching apertures on the sidewalls of both are aligned for insertion of the opposing ends of a wirelike generally U-shaped leg structure. An outwardly extending projection is provided on the bracket adjacent each of the sidewall apertures to position the leg structure in a horizontal position beneath the housing or in a vertical downwardly extending operative position. The leg structure length exceeds the length of the utensil legs thereby effecting a tilting of the utensil when it's placed in the operative position.

6 Claims, 3 Drawing Figures

U.S. Patent   Dec. 23, 1975   3,927,610
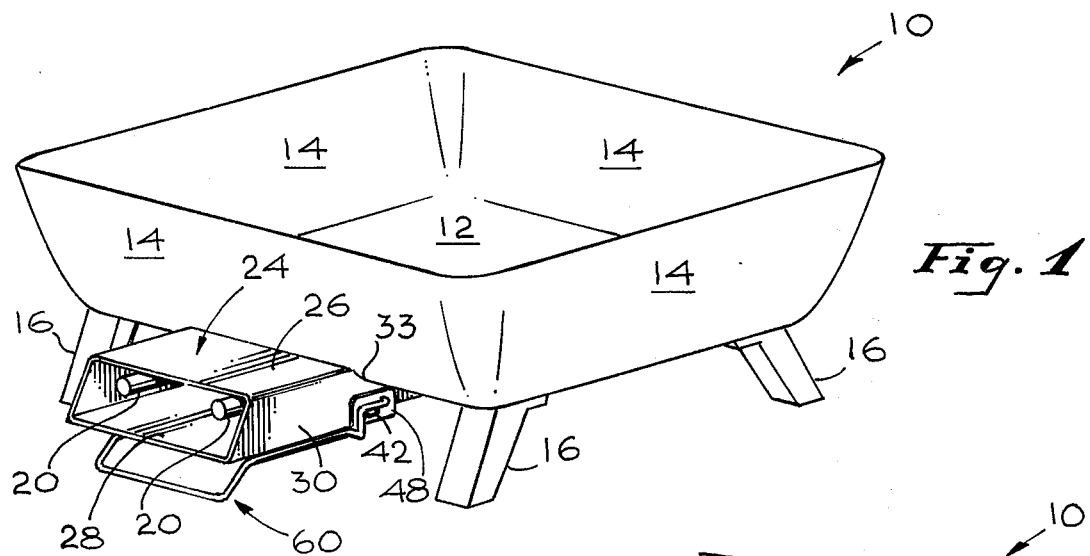
Fig. 1
Fig. 2
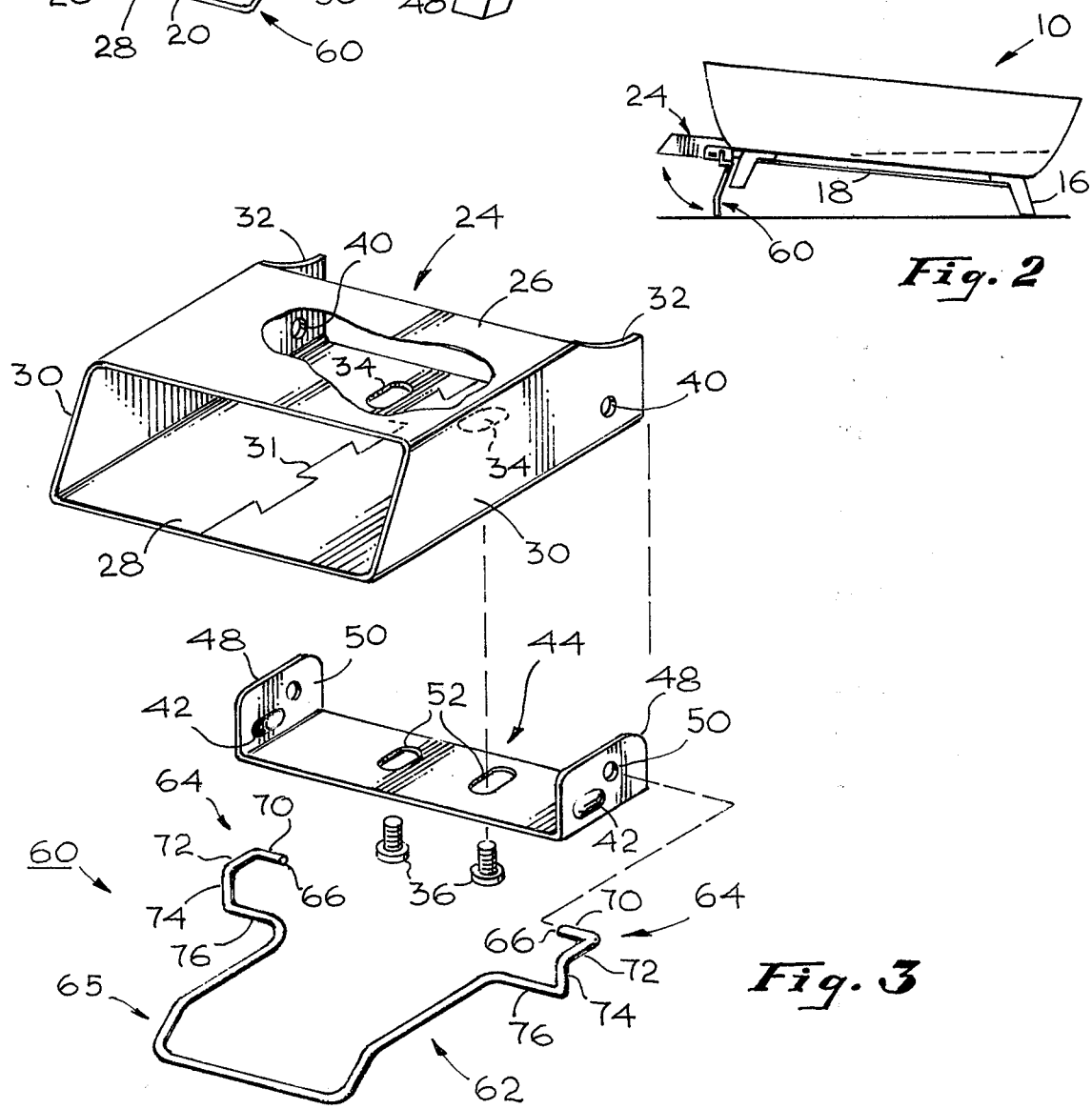
Fig. 3

AUXILIARY COOKING UTENSIL LEG

BACKGROUND OF THE INVENTION

1. Field of the Invention

The present invention is related to household cookware and, more particularly, to a tiltable electric cooking vessel.

2. Description of the Prior Art

A desirable attribute of electrical cookware, especially the type commonly referred to as electric skillet or fry pan, is the ability to incline the cooking surface. With such inclination cooking liquids exuded from foodstuffs being heated will drain away and result in a more savory product.

U.S. Pat. No. 3,215,063 discloses an adjustable fry pan leg-handle assembly in which a spring-biased ball engages a corresponding opening on a skillet mounted bracket. The bracket has two orifices so that the ball may slip out of one and into the other for adjusting the inclination or height of the skillet. Of course, this system has the disadvantage of possible jogging loose during use. Additionally, over a period of time the spring may weaken or cooking fluids may become encrusted around the spring or ball thereby making its engagement less secure than would be desirable. This would be especially hazardous when one is cooking a heavy foodstuff like a roast, ham, or the like.

SUMMARY OF THE INVENTION

The present invention provides an auxiliary leg assembly operating in conjunction with the customary support structure in the form of legs on household cooking utensils. The auxiliary leg is mounted upon a housing and pivot bracket which in turn are secured to an electrical terminal outlet adjacent the bottom of a cooking utensil. The pivot bracket is generally U-shaped and fits about the exterior, sides and bottom of the electrical terminal housing.

A wire-like leg structure generally U-shaped in configuration is adapted to be inserted within apertures extending in alignment through the sidewalls of the housing pivot bracket. The opposing end sections of the leg structure are mirror images and each presents an interconnecting generally L-shaped configuration such that the leg structure can be pivoted in the apertures to a substantially horizontal position beneath the housing or vertical to an operative position in which it would tilt the cooking utensil. The leg structure is maintained in the vertical or horizontal position by means of a protuberance on the sidewalls of the pivot bracket operating in conjunction with a portion of the end section of the leg structure to inhibit free rotation of the leg structure.

BRIEF DESCRIPTION OF THE DRAWINGS

FIG. 1 is a perspective view showing a cooking vessel with an auxiliary leg assembly constructed in accordance with the present invention.

FIG. 2 is a side elevation view showing the invention of FIG. 1 with the leg structure in operative position.

FIG. 3 is an enlarged exploded view of the auxiliary leg assembly of the present invention.

DESCRIPTION OF A PREFERRED EMBODIMENT

Referring now to the drawings and, more particularly to FIG. 1 thereof, a cooking vessel in the form of an electric skillet is shown generally by reference numeral 10. The skillet includes a bottom 12 with slightly flared upstanding sidewalls 14. The skillet is supported by legs 16, preferably constructed of a molded plastic material that is resistant to the effects of heat.

Although forming no part of the present invention, the fry pan 10 includes a heating element 18 which is integral to the underside of the bottom 12. Electrical terminals 20 extend outwardly from the electric heating element and provide a means for connection to an electrical power supply (not shown).

Partially enclosing the terminals 20 is electrical terminal housing shown generally by reference numeral 24. The housing includes top wall 26 and bottom wall 28 with opposing sidewalls 30. Typically the housing is constructed of sheet metal which is fabricated into a rectangular hollow shape. The free edges are secured with dovetail connections 31. The housing includes arcuate beveled edge sections 32 corresponding to the curvature of the bottom edge 33 of the skillet 10.

The housing bottom wall 28 includes orifices 34 for insertion of fasteners 36 for connection to suitable fastening means (not shown) on the skillet bottom 12. Each housing sidewall 30 includes an inner aperture 40 located proximate the end of the sidewall adjacent bevels 32.

The invention includes a pivot bracket 44 which is generally U-shaped having an elongated base 46 with opposing sidewalls 48. The configuration of the pivot bracket corresponds to the housing shape in that the length of base 46 is slightly longer than housing bottom wall 28. In this manner the bracket may closely fit against the housing 24.

Each sidewall 48 of the bracket is provided with an outer aperture 50 and an outwardly extending protuberance 42. The protuberances are preferably located a distance below and horizontally forward of the apertures 50 about equal to the diameter of the leg structure 60. Additionally, the elongated base 46 includes orifices 52. The orifices 52 are adapted to align with orifices 34 when the housing and bracket are assembled. In this way fasteners 36 extend through both orifices 34 and 52 for fastening to the aforementioned skillet bottom 12.

Similarly, outer apertures 50 are placed in the sidewalls 48 such that when the bracket 44 is interfitted about the outer surfaces of the housing 24 each aperture may become aligned with the corresponding inner aperture 40.

The auxiliary leg assembly of the present invention includes a wire-like leg structure 60 having a base portion 62 and opposing upper end portions 64. The base portion 62 is generally U-shaped in configuration and the upper end portions 64 are substantially mirror images of each other. The end portions comprise terminal ends 66 which are to be inserted through the aligned outer apertures 50 and inner apertures 40 when the bracket 44 is assembled with housing 24. The distance between the terminal ends 66 is less than the distance between sidewalls 48 and sidewalls 30 of the housing. During assembly, the ends are spread apart for insertion into the apertures. Because of the resilience of the wire-like structure, the ends will subsequently return to about their original configuration and be permanently retained within the apertures once inserted therein. The diameter of the apertures are slightly larger than the wire-like leg structure diameter. This permits rotation of the structure about an axis defined by a line extending through the center of each of the inner and outer apertures. It will be understood that it is desirable to maintain the leg structure in a stressed posture by preventing its complete return to its original configuration. In this manner the end portions 64 will be biased inwardly thereby facilitating controlled rotation of the leg structure and retention of the terminal ends 66 within the apertures.

FIG. 3 illustrates the manner of assembly of the present invention with the leg structure 60 in a substantially horizontal position. Terminal ends 66 generally extend a distance beyond inner apertures 50. Extending outwardly a lateral direction relative to sidewalls 48 are end sections 70. The end sections function as axles for rotation of the leg structure. Merging about 90° from the end sections 70 are lever arm sections 72. The lever arm sections extend about parallel to the bracket sidewalls 48 and generally make contact therewith because of the aforementioned inward bias of the end portions 64.

The lever arm sections turn downwardly about 90° into pendant sections 74. The pendant sections extend downwardly a distance about equal to the distance between the aperture 50 and the outer surface of the elongated base 46. The pendant sections turn inwardly about 90° to define connector portions 76. The connector portions extend about parallel to the aforementioned end sections 70 and finally merge into the bracket base portion 62 with a 90° turn.

The leg structure base portion 62 includes an inclined lower portion 65. The lower portion may be defined by a plane passing through the longitudinal axis of the leg which is oriented angularly with respect to a plane intersecting the longitudinal axis of the base structure.

It will be noted that the overall length of the leg structure 60 is greater than the vertical length of legs 16. As such, when the leg structure is placed in a substantially vertical operative position as shown in FIG. 2, the electric terminal end of the skillet will be inclined. In this position the lever arm sections will be located above the protuberance 42. When it is in a horizontal inoperative position, the lever arm sections 72 will be slightly beyond the end of the protuberance 42. The leg structure will not assume a stable location intermediate of the horizontal or vertical positions because of the inward bias of the wire leg structure which will resist outward deflection of the end portions 64 and urge the leg structure 60 into either a horizontal or vertical position.

Although but one embodiment has been shown and described, it will be understood that numerous changes and different embodiments of the invention may be made without departing from the spirit and scope of the invention. Therefore, it is intended that the invention shall be defined only by the scope of the appended claims.

What is claimed is:
1. In a cooking vessel having a bottom and sidewalls, an auxiliary leg assembly comprising:
    an electrical terminal housing located adjacent said bottom, said housing including a top and bottom wall and opposing sidewalls having an inner aperture located therein;
    a generally U-shaped pivot bracket having opposing sidewall portions and an elongated base, said bracket including an outer aperture on each sidewall portion thereof and being positioned to locate said outer apertures over a corresponding inner aperture in each of said housing sidewalls; and,
    a leg structure having a base portion and inwardly directed opposing upper end portions each having a terminal end resiliently engaging each of said apertures for rotation about a line defined by the center axis of said apertures.

2. The leg assembly of claim 1 wherein said leg structure base portion is generally U-shaped with said opposing upper end portions being mirror images of each other and comprising end sections extending laterally outwardly from said terminal ends positioned in said bracket sidewalls and turning about 90° into lever arm sections extending about parallel to said bracket sidewalls, said lever arm sections turning about 90° into pendant sections extending at least a distance about equal to the distance between said apertures and said bracket elongated base, said pendant sections turning about 90° into connector portions extending inwardly about parallel to said end sections and merging into said bracket base portion.

3. The leg assembly of claim 2 wherein said leg structure base portion includes a lower portion inclined angularly with respect to said base portion.

4. The leg assembly of claim 2 wherein each of said bracket sidewall portions include an outwardly projecting protuberance located proximate said apertures in a manner to inhibit movement of said lever arm section thereacross.

5. The leg assembly of claim 3 wherein said aperture is about one leg structure diameter above and horizontally offset from said protuberance.

6. The leg assembly of claim 5 wherein said bracket and said housing include matching orifices in alignment with fasteners extending therethrough to fastening means on the bottom of said vessel for securing said leg assembly to said vessel.

* * * * *